US012803316B2

(12) United States Patent
Ninomiya et al.

(10) Patent No.: US 12,803,316 B2
(45) Date of Patent: Nov. 17, 2026

(54) CHARGER WITH FEEDBACK CONTROL FOR POWER STORAGE DEVICE

(71) Applicant: Daifuku Co., Ltd., Osaka (JP)

(72) Inventors: Daizo Ninomiya, Hinocho (JP); Atsushi Miyazaki, Hinocho (JP); Hiroshi Matsubara, Hinocho (JP); Hiroshi Onishi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 756 days.

(21) Appl. No.: 18/210,336

(22) Filed: Jun. 15, 2023

(65) Prior Publication Data

US 2023/0411985 A1 Dec. 21, 2023

(30) Foreign Application Priority Data

Jun. 16, 2022 (JP) ................................. 2022-097538

(51) Int. Cl.

| | |
|---|---|
| ***H01M 10/46*** | (2006.01) |
| ***B60L 53/122*** | (2019.01) |
| ***B60L 53/62*** | (2019.01) |
| ***H02J 7/80*** | (2026.01) |
| ***H02J 7/90*** | (2026.01) |
| ***H02J 50/10*** | (2016.01) |

(52) U.S. Cl.

CPC ............ *H02J 7/933* (2026.01); *B60L 53/122* (2019.02); *B60L 53/62* (2019.02); *H02J 7/80* (2026.01); *H02J 50/10* (2016.02); *B60L 2210/30* (2013.01); *B60L 2240/547* (2013.01); *B60L 2240/549* (2013.01)

(58) Field of Classification Search

CPC ........ H02J 7/94; H02J 7/80; H02J 7/96; H02J 7/60; H02J 50/005; B60L 53/62; B60L 2210/30; B60L 2240/547; B60L 2240/549

USPC ....... 320/107, 108, 114, 115, 132, 134, 136, 320/161, 162

See application file for complete search history.

(56) References Cited

U.S. PATENT DOCUMENTS

| | | | | |
|---|---|---|---|---|
| 2018/0342880 | A1* | 11/2018 | Yasuda | H02J 7/50 |
| 2019/0199219 | A1* | 6/2019 | Ida | H01M 10/48 |

FOREIGN PATENT DOCUMENTS

| | | | | |
|---|---|---|---|---|
| EP | 3503342 A1 * | 6/2019 | | H02J 7/00 |
| JP | 2009123560 A | 6/2009 | | |

(Continued)

OTHER PUBLICATIONS

Machine translation of JP2009123560A (Jun. 4, 2009) (Year: 2009).*

*Primary Examiner* — Edward Tso

(74) *Attorney, Agent, or Firm* — The Webb Law Firm

(57) ABSTRACT

A charger includes a power regulator that regulates power supplied from a power supply and outputs the power to a power storage device, a current detector that detects a battery current supplied to the power storage device, a voltage detector that detects a battery voltage, a controller that performs feedback control over the power regulator based on the battery current and the battery voltage, a feedback signal generator that generates, based on the battery current and the battery voltage, a power feedback signal usable for constant current control and constant voltage control, and a feedback calculator that generates, based on a difference between a command value and the power feedback signal, a control signal to control the power regulator.

5 Claims, 2 Drawing Sheets

(56) References Cited

FOREIGN PATENT DOCUMENTS

| | | | |
|---|---|---|---|
| JP | 201686472 | A | 5/2016 |
| JP | 2019118193 | A | 7/2019 |

* cited by examiner

CHARGER WITH FEEDBACK CONTROL FOR POWER STORAGE DEVICE

CROSS-REFERENCE TO RELATED APPLICATION

This application claims priority to Japanese Patent Application No. 2022-097538 filed Jun. 16, 2022, the disclosure of which is hereby incorporated by reference in its entirety.

BACKGROUND OF THE INVENTION

Field of the Invention

The present invention relates to a charger for a power storage device for charging a power storage device through feedback control based on a battery current supplied to the power storage device and a battery voltage between the positive and negative electrodes of the power storage device.

Description of Related Art

Japanese Unexamined Patent Application Publication No. 2019-118193 describes, as an example common charger, a charger that monitors a charging current (battery current) during charging and switches between constant current control and constant voltage control based on a current value of the charging current to charge a secondary battery (power storage device). More specifically, in an early stage of charging, a constant charging current is supplied to the secondary battery through constant current control. In response to the terminal voltage of the secondary battery exceeding a predetermined value, the control method is switched to the constant voltage control for applying a constant charging voltage to the secondary battery. In a final stage of constant voltage control, the charging current gradually decreases over the period of charging. In response to the charging current decreasing below a predetermined value, the charging is stopped.

SUMMARY OF THE INVENTION

In the charger described above, feedback control is performed based on the charging current during the constant current control, and the terminal voltage of the secondary battery is used to determine to switch from the constant current control to the constant voltage control. During the constant voltage control, feedback control is performed based on the terminal voltage of the secondary battery, and the charging current is used to determine to stop the constant voltage control, or in other words, to stop the charging. The above control switching determination and stop determination may be performed by a charge controller using software.

During charging, the power storage device may be disconnected from the charger. This may disconnect the electrical connection between the power storage device and the charger or may cause a short circuit between the positive and negative electrodes of the power storage device or in a load that receives power supply from the power storage device. Once the electrical connection between the power storage device and the charger is disconnected during the constant current control, a current cannot flow through the circuit. This can cause a sudden increase in the voltage to be applied to the power storage device, thus causing an overvoltage applied to the charger. During the constant current control, feedback control is performed based on the charging current, which may not allow detection of such an overvoltage or may cause a delay in detecting such an overvoltage. When a short circuit as described above occurs during the constant voltage control, an overcurrent may flow through the charger. During the constant voltage control, feedback control is performed based on the terminal voltage, which may not allow detection of such an overcurrent or may cause a delay in detecting such an overcurrent.

In response to the above, awaited techniques include a charger that can charge a power storage device with an appropriate control method and respond quickly to an abnormal state during charging.

In response to this, a charger for a power storage device includes a power regulator that regulates power supplied from a power supply and outputs the power to a power storage device, a current detector that detects a battery current supplied from the power regulator to the power storage device, a voltage detector that detects a battery voltage between positive and negative electrodes of the power storage device, a controller that performs feedback control over the power regulator based on the battery current and the battery voltage and is switchable between constant current control and constant voltage control, a feedback signal generator that generates, based on the battery current and the battery voltage, a power feedback signal usable for the constant current control and the constant voltage control, and a feedback calculator that generates, based on a difference between a command value being a target value of the battery current or the battery voltage and the power feedback signal, a control signal to control the power regulator through the constant current control or the constant voltage control.

In this structure, for example, the controller performs, in an early stage of charging in which the battery voltage is low, feedback control to allow the battery current to be constant through constant current control. When the battery voltage increases over the period of charging, the controller performs feedback control to allow a voltage applied between the positive and negative electrodes of the power storage device from the power regulator to be constant through constant voltage control. The power storage device can thus be charged with an appropriate control method. This structure generates, based on the battery current detected by the current detector and the battery voltage detected by the voltage detector, the power feedback signal that can be used for both the constant current control and the constant voltage control. This allows the control method to be shifted smoothly from the constant current control to the constant voltage control. A sudden change in the voltage or current due to, for example, disconnection of the electrical connection between the power storage device and the charger or a short circuit increases a value (corresponding to either a detection value of the battery current or a detection value of the battery voltage depending on the control method) indicated by the power feedback signal, which is common to the constant current control and the constant voltage control. Power output from the charger to the power storage device can thus be limited with the control method used. Any abnormality in at least one of the power storage device or the charger can thus be responded quickly. In this manner, the charger with this structure can charge a power storage device with an appropriate control method and can also respond quickly to an abnormal state during charging.

Further features and advantageous effects of the charger for a power storage device will be apparent from exemplary and nonlimiting embodiments described below with reference to the drawings.

DESCRIPTION OF THE INVENTION

A charger for a power storage device according to one or more embodiments of the present invention will now be described with reference to the drawings. A charger 10 incorporated in an automatic guided vehicle (AGV) 9 to charge a power storage device 8 will be described herein. However, the power storage device 8 and the charger 10 may not be incorporated in the AGV 9.

Figure 1:
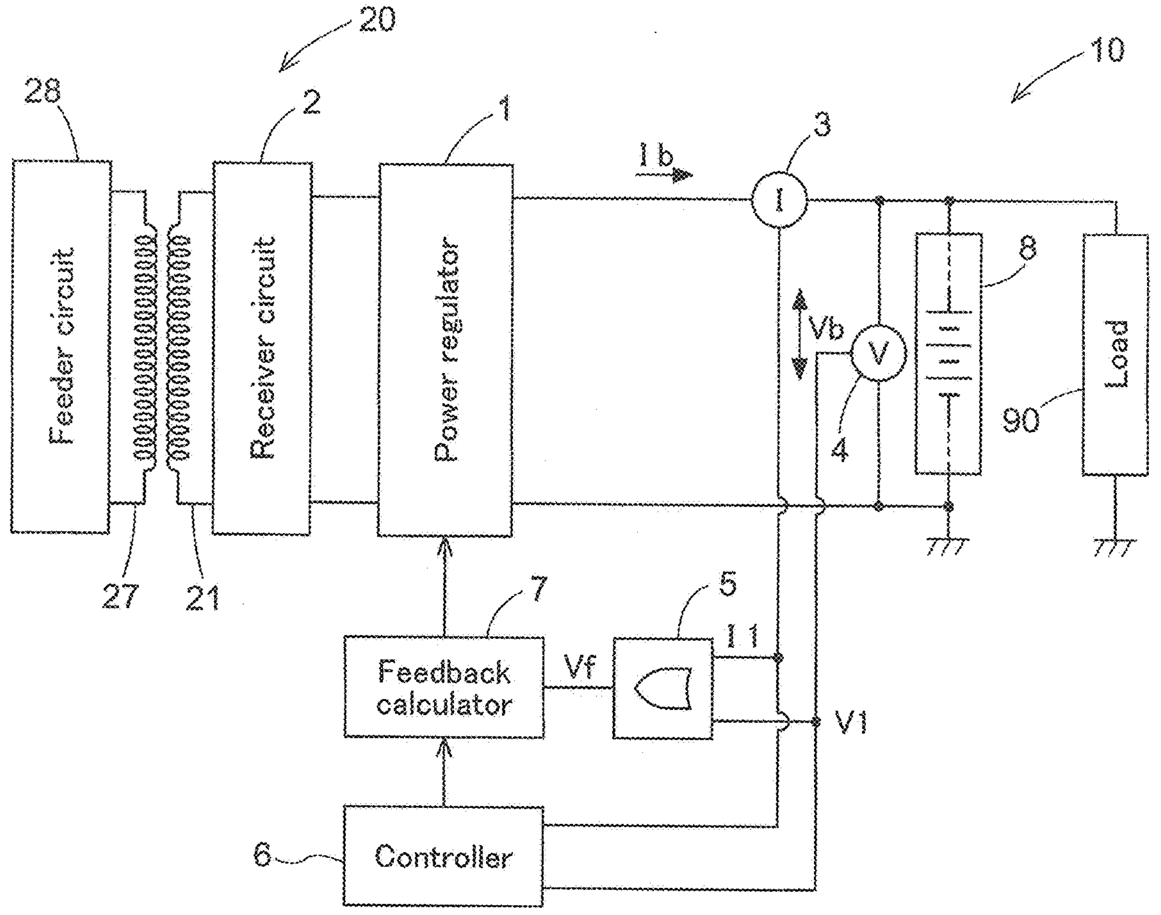
FIG. 1 is a schematic functional block diagram of a charger showing its example configuration.
Figure 2:
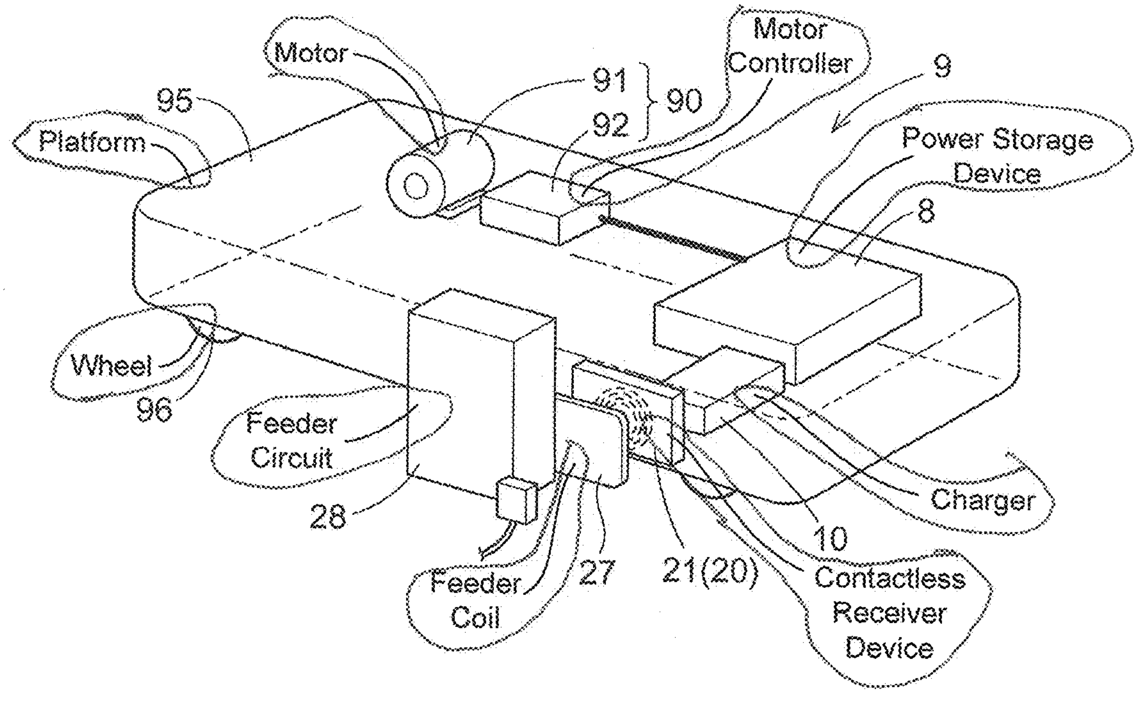
FIG. 2 is a transparent perspective view of an example automatic guided vehicle incorporating the charger.

The transparent perspective view of FIG. 2 schematically shows an example of the AGV 9 incorporating the charger 10 according to the present embodiment. The functional block diagram of FIG. 1 schematically shows an example configuration of the charger 10 according to the present embodiment. As shown in FIG. 2, the AGV 9 includes the power storage device 8, a contactless receiver device 20, the charger 10, and a load 90. The contactless receiver device 20 serves as a power supply that supplies power to charge the power storage device 8. The charger charges the power storage device 8 using the power supplied from the contactless receiver device 20. The load 90 operates using power from the power storage device 8. The load 90 includes, for example, a motor 91 that drives wheels 96 and a motor controller 92 (including, for example, a processor such as a microcomputer and a drive circuit) that drives and controls the motor 91. The power storage device 8 is a secondary battery such as a lithium-ion battery. The power storage device 8 includes, for example, multiple battery cells (not shown) and a protection circuit (not shown) to protect the battery cells from, for example, overcharge, overdischarge, and a short circuit.

The power storage device 8, the contactless receiver device 20, the charger 10, and the load 90 are accommodated in a platform 95 in the AGV 9. For example, articles are placed on the upper surface of the platform 95 for transportation. For example, transfer equipment to transfer articles may be located on the platform 95 although not shown.

As shown in FIG. 1, the charger 10 includes a power regulator 1, a current detector 3, a voltage detector 4, and a controller 6. The power regulator 1 regulates power supplied from the contactless receiver device 20 serving as a power supply and outputs the power to the power storage device 8. The current detector 3 detects a battery current Ib supplied from the power regulator 1 to the power storage device 8. The voltage detector 4 detects a battery voltage Vb between the positive and negative electrodes of the power storage device 8. The controller 6 performs feedback control over the power regulator 1 based on the battery current Ib and the battery voltage Vb. The battery voltage Vb may also be referred to as a voltage applied between the positive and negative electrodes of the power storage device 8 from the power regulator 1.

The controller 6 switches between constant current control and constant voltage control. More specifically, in an early stage of charging in which the amount of charge in the power storage device 8 is small, the battery current Ib being constant is supplied to the power storage device 8 through constant current control. In other words, the controller 6 performs, based on a deviation between the battery current Ib (current feedback value I1) detected by the current detector 3 and a current command value being a target value of a current supplied to the power storage device 8, feedback control to cause the battery current Ib to match the current command value (constant current control). In response to the battery voltage Vb (voltage between the terminals in the power storage device 8) exceeding a predetermined switching voltage, the control method is switched to the constant voltage control. A constant charging voltage is applied to the power storage device 8. In other words, the controller 6 performs, based on a deviation between the battery voltage Vb (voltage feedback value V1) detected by the voltage detector 4 and a voltage command value being a target value of a voltage applied to the power storage device 8, feedback control to cause the battery voltage Vb to match the voltage command value (constant voltage control). In a final stage of constant voltage control, the battery current Ib (current feedback value I1 being the detection value of the battery current Ib) gradually decreases over the period of charging. In response to the battery current Ib decreasing below a predetermined stop current, the charging is stopped.

The controller 6 mainly includes a processor such as a microcomputer. The controller 6 performs the constant current control and the constant voltage control described above with hardware such as the processor and software implemented on the hardware operating in cooperation. As described in detail later, the power regulator 1 is a switching power supply circuit including a switching element (e.g., a switching element 11 shown in FIG. 3). The controller 6 generates a switching control signal for controlling the power regulator 1 (switching element 11 in the power regulator 1) through the constant current control or the constant voltage control. In the present embodiment, as described later with reference to FIG. 3, the switching control signal generated by the controller 6 and a switching control signal generated by a feedback calculator 7 can be selected. The switching control signal is, for example, a pulse-width modulated signal. A current (battery current Ib) supplied from the power regulator 1 to the power storage device 8 and a voltage (battery voltage Vb) applied to the power storage device 8 are controlled in accordance with the pulse width. The switching control signal is input into a control terminal (a gate terminal or a base terminal) in the switching element through a drive circuit (not shown).

The charger 10 according to the present embodiment further includes the feedback calculator 7 that can perform feedback control and a feedback signal generator 5 that generates a power feedback signal Vf used in the feedback calculator 7. The feedback signal generator 5 generates, based on the battery current Ib (current feedback value I1 being the detection value of the battery current Ib) and the battery voltage Vb (voltage feedback value V1 being the detection value of the battery voltage Vb), the power feedback signal Vf that can be used for both the constant current control and the constant voltage control. The feedback calculator 7 generates, based on the difference between a command value being a target value of the battery current Ib or the battery voltage Vb and the power feedback signal Vf, a control signal for controlling the power regulator 1 (switching element 11 in the power regulator 1) through constant current control or constant voltage control.

Figure 3:
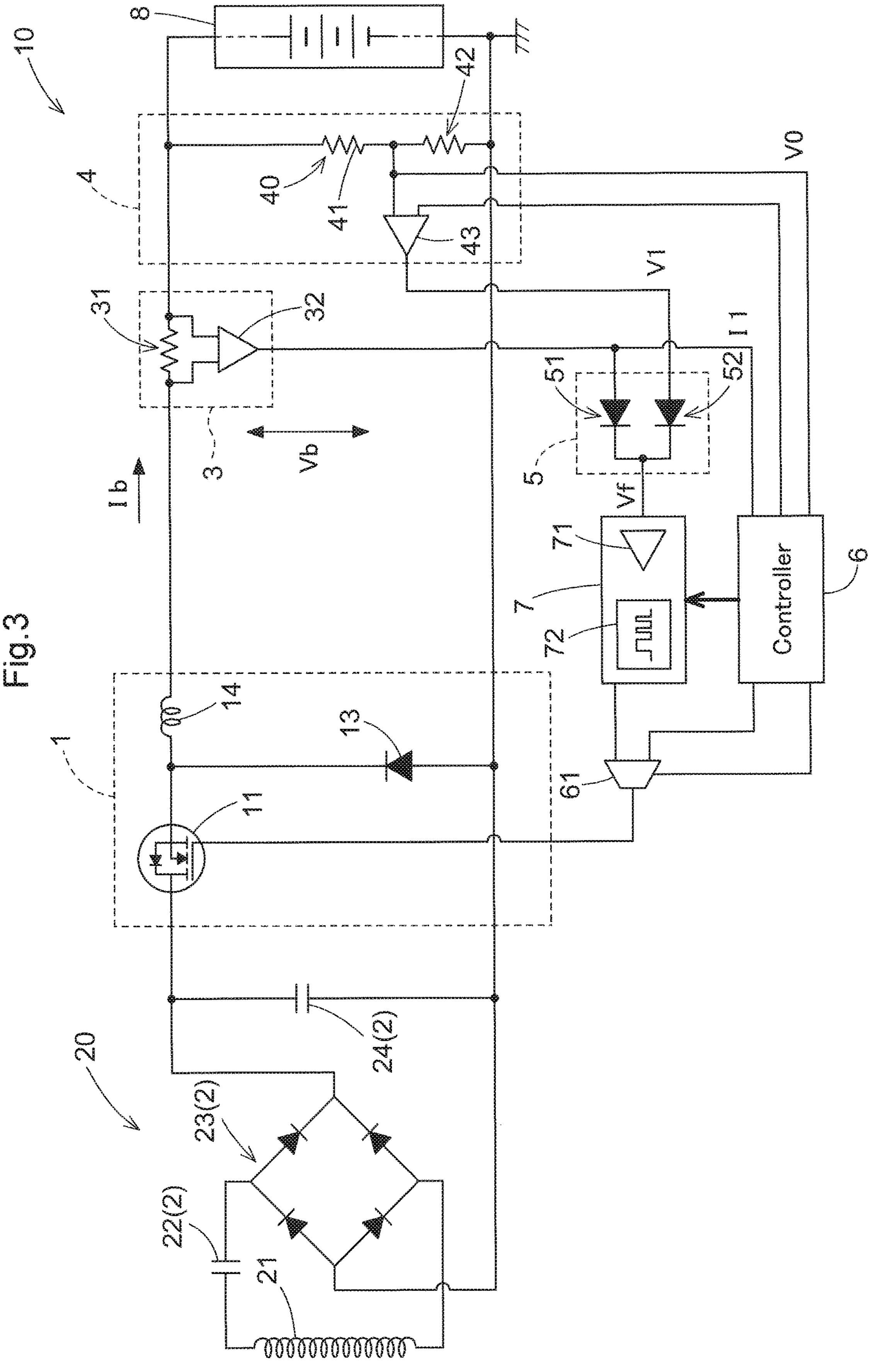
FIG. 3 is a schematic circuit block diagram of the charger showing its example configuration.

A schematic circuit block diagram of the charger 10 showing an example configuration (FIG. 3) will also be referred to below. In the present embodiment, the power supply that supplies power to the charger 10 is the contactless receiver device 20 as described above. As shown in FIGS. 1 to 3, the contactless receiver device 20 includes a receiver coil 21 that receives power from a feeder coil 27 contactlessly by electromagnetic induction and a rectifier circuit 23 that rectifies an alternating current (AC) received by the receiver coil 21 into a direct current (DC). In the present embodiment, the rectifier circuit 23 is a full-wave rectifier circuit including diodes. A series resonant capacitor 22 is between the receiver coil 21 and the rectifier circuit 23. More specifically, the series resonant capacitor 22 is arranged in series with the receiver coil 21 to form a series resonant circuit. The structure is not limited to this example. A capacitor may be arranged in parallel with the receiver coil 21 to form a parallel resonant circuit. A pulse component remains in the DC rectified from the AC by the rectifier circuit 23. To smooth the pulse component, a smoothing capacitor 24 is located between the rectifier circuit 23 and the power regulator 1. The series resonant capacitor 22, the rectifier circuit 23, and the smoothing capacitor 24 are included in a receiver circuit 2. The contactless receiver device 20 thus includes the receiver coil 21 and the receiver circuit 2.

As shown in FIGS. 1 and 2, the feeder coil 27 receives AC power from a feeder circuit 28 (feeder device). The feeder circuit 28 and the feeder coil 27 are installed at a charging station, for example, along a travel path of the AGV 9 or at a position retracted from the travel path. As shown in FIG. 2, the AGV 9 stops to allow the receiver coil 21 in the AGV 9 to face the feeder coil 27 at the charging station. This causes the receiver coil 21 to receive power from the feeder coil 27 by electromagnetic induction. The feeder circuit 28 is installed stationary. The feeder circuit 28 receives power from a utility power supply with wired connection.

Although the power supply that supplies power to the charger 10 is the contactless receiver device 20 in the present embodiment, the power supply is not limited to this example. For example, power may be supplied with wired connection at a charging station as described above (a charging station at a position retracted from the travel path in some embodiments).

The power regulator 1 is a chopper circuit including a switching element. In the present embodiment, the chopper circuit includes, as a step-down chopper, the switching element 11 connected in series with a chopper coil 14 in an area of the positive electrode and a chopper diode 13 connected in parallel between the positive and negative electrodes. The chopper circuit may have any other structure. The chopper circuit may have the structure of a step-up chopper or a step-up or step-down chopper. The power regulator 1 may also be a switching power supply circuit including, for example, a DC-DC converter with a coil.

The controller 6 and the feedback calculator 7 or the controller 6 generates switching control signals for controlling the switching element 11 in the power regulator 1 and provides the signals to the control terminal in the switching element 11 through the drive circuit (not shown). As described above, the switching control signal is, for example, a pulse-width modulated signal. A current (battery current Ib) supplied from the power regulator 1 to the power storage device 8 and a voltage (battery voltage Vb) applied to the power storage device 8 are controlled in accordance with the pulse width.

The current detector 3 detects the battery current Ib. The current detector 3 is arranged in series between the power regulator 1 and the positive terminal of the power storage device 8. In the present embodiment, the current detector 3 includes a shunt resistor 31 through which the battery current Ib flows and a differential amplifier 32 that detects a voltage drop in the shunt resistor 31 and outputs the detection result of the battery current Ib as a voltage value. The current detector 3 may have any other structure, and may include a contactless current detection circuit including a Hall element that detects a magnetic field generated by the battery current Ib flowing and an operational amplifier that amplifies a voltage generated in the Hall element with the Hall effect.

The voltage detector 4 detects the battery voltage Vb. The voltage detector 4 is arranged in parallel between the positive and negative electrodes of the power storage device 8. In the present embodiment, the voltage detector 4 includes a resistive voltage divider 40 including a first resistor 41 and a second resistor 42 connected between the positive and negative electrodes of the power storage device 8 and an adder 43 (operational amplifier) that adjusts a detection value. The charger 10 can charge the power storage device 8 with a different rated voltage. For example, the charger 10 is connectable to the power storage device 8 with a rated voltage of 12, 24, or 48 V. In this case, with the first resistor 41 and the second resistor 42 having a common circuit constant, the initial detection value of the battery voltage Vb (initial voltage feedback value V0) greatly differs depending on the rated voltage of the power storage device 8. Thus, for example, multiple second resistors 42 with different resistance values may be used to switch, in accordance with the rated voltage of the power storage device 8, the resistance value of the resistive voltage divider 40 with, for example, a switch. Multiple first resistors 41 with different resistance values or multiple first resistors 41 with different resistance values and multiple second resistors 42 with different resistance values may also be used to switch, in accordance with the rated voltage of the power storage device 8, the resistance value of the resistive voltage divider 40 with, for example, a switch.

As described above, the feedback signal generator 5 generates, based on the current feedback value I1 being the detection value of the battery current Ib and the voltage feedback value V1 being the detection value of the battery voltage Vb, the power feedback signal Vf that can be used for both the constant current control and the constant voltage control in the feedback calculator 7. The power feedback signal Vf cannot indicate whether the signal shows the detection value of the battery current Ib or the detection value of the battery voltage Vb. The power feedback signal Vf may thus be equally used for both the constant current control and the constant voltage control.

However, the detection values represented by voltage values of the battery current Ib detected by the current detector 3 and the battery voltage Vb detected by the voltage detector 4 may not be easily adjusted to equivalent signal levels (voltage levels) upon detection. The adder 43 adjusts the signal level indicated by the initial detection value of the battery voltage Vb (initial voltage feedback value V0) to be equivalent to the signal level indicated by the detection value of the battery current Ib (current feedback value I1). The adder 43 mainly includes an operational amplifier. The adder 43 adds an offset value provided from the controller 6 to the initial voltage feedback value V0 (including an addition of a negative value) and multiplies the resultant value by a preset coefficient to output the voltage feedback value V1 with its signal level equivalent to that of the current feedback value Ti. The adder 43 corresponds to a detection value adjuster that adjusts a detection value to cause the signal level indicated by the detection value of the battery current and the signal level indicated by the detection value of the battery voltage to be equivalent to each other.

For the resistive voltage divider 40 including the first resistor 41 and the second resistor 42 having circuit constants for outputting the initial voltage feedback value V0 with the signal level equivalent to the current feedback value Ti, the detection value adjuster such as the adder 43 may be eliminated. Although the voltage detector 4 includes the detection value adjuster in the present embodiment, the current detector 3 may include the detection value adjuster in some embodiments. More specifically, at least one of the current detector 3 or the voltage detector 4 in the charger 10 includes the detection value adjuster that adjusts a detection value to cause the signal level indicated by the detection value of the battery current Ib (current feedback value Ti) and the signal level indicated by the detection value of the battery voltage Vb (voltage feedback value V1) to be equivalent to each other.

The feedback signal generator 5 outputs, as the value of the power feedback signal Vf, the greater value of the detection value of the battery current Ib (current feedback value I1) and the detection value of the battery voltage Vb (voltage feedback value V1). In the present embodiment, as shown in FIG. 3, the feedback signal generator 5 includes a wired-OR circuit including a first diode 51 with a first anode terminal and a first cathode terminal and a second diode 52 with a second anode terminal and a second cathode terminal. More specifically, the first diode 51 and the second diode 52 are included in the wired-OR circuit in which the first anode terminal is connected to the current detector 3, the second anode terminal is connected to the voltage detector 4, and the first cathode terminal and the second cathode terminal are connected to each other.

The feedback signal generator 5 may include, for example, a comparator including an operational amplifier and an analog multiplexer. More specifically, the feedback signal generator may include a comparator that compares a voltage having the current feedback value I1 with a voltage having the voltage feedback value V1 and an analog multiplexer that selectively outputs the current feedback value I1 or the voltage feedback value V1 based on an output from the comparator. The feedback signal generator 5 including the wired-OR circuit including the diodes described above has a simple structure with a smaller circuit size and can achieve high responsiveness.

The feedback calculator 7 includes a proportional-integral-derivative controller 71 (PID controller) including an operational amplifier and a pulse generator 72 that generates the switching control signal by pulse width modulation. The feedback calculator 7 receives, from the controller 6, a control method selection command and a command value being a target value of the battery current Ib or the battery voltage Vb corresponding to the control method. As shown in FIG. 3, the controller 6 also obtains the current feedback value I1 and the initial voltage feedback value V0. The controller 6 determines the control method based on the current feedback value I1 and the initial voltage feedback value V0 and outputs the control method selection command to the feedback calculator 7. The controller 6 also outputs, to the feedback calculator 7, the command value of the battery current Ib or the battery voltage Vb corresponding to the control method. Although the controller 6 obtains the initial voltage feedback value V0 as shown in FIG. 3, which can be corrected in the controller 6, the controller 6 may obtain the voltage feedback value V1.

As described above, in the early stage of charging in which the amount of charge in the power storage device 8 is small, the battery current Ib being constant is supplied to the power storage device 8 through constant current control. In the early stage of charging with the constant current control being selected, the battery voltage Vb is low, and a large amount of battery current Ib is supplied to the power storage device 8. More specifically, the current feedback value I1 is greater than the voltage feedback value V1, and the power feedback signal Vf thus indicates the current feedback value I1 In other words, the power feedback signal Vf substantially indicates the current feedback value I1. The feedback calculator 7 can thus appropriately perform constant current control based on the command value of the battery current Ib and the power feedback signal Vf.

In response to the control method being switched to the constant voltage control, a constant charging voltage is applied to the power storage device 8. The battery voltage Vb is higher than the switching voltage to switch to the constant voltage control, with a small difference between the charging voltage and the battery voltage Vb. The battery current Ib thus decreases. More specifically, the voltage feedback value V1 is greater than the current feedback value Ti, and the power feedback signal Vf thus indicates the voltage feedback value V1. In other words, the power feedback signal Vf substantially indicates the voltage feedback value V1. The feedback calculator 7 can thus appropriately perform constant voltage control based on the command value of the battery voltage Vb and the power feedback signal Vf.

As the battery current Ib decreases over the period of charging, the current feedback value I1 also decreases. In response to the current feedback value I1 falling below the predetermined stop current, the controller 6 outputs a command to stop the charging to the feedback calculator 7. The charging of the power storage device 8 is thus stopped.

As described above, the charger 10 can also control the power regulator 1 by generating the switching control signal in the controller 6, without generating the switching control signal with the feedback calculator 7. As described above, the controller 6 obtains the current feedback value I1 and the initial voltage feedback value V0 (or the voltage feedback value V1). The controller 6 switches between the constant current control and the constant voltage control based on these values and generates the switching control signal.

As shown in FIG. 3, the component that controls the power regulator 1 is selectable with a multiplexer 61 that can selectively output the switching control signal generated by the feedback calculator 7 or the switching control signal generated by the controller 6 based on a selection signal from the controller 6. However, the controller 6 performs feedback control with the hardware and the software operating in cooperation. High responsiveness is thus achieved more easily in the feedback control performed by the feedback signal generator 5 and the feedback calculator 7 including hardware mainly including the diodes and the operational amplifier than in the feedback control performed by the controller 6. For transportation efficiency, the AGV 9 in the present embodiment is to stop at the charging station for a short time, end charging quickly, and start. The feedback control is thus to be performed by the feedback signal generator 5 and the feedback calculator 7, or by hardware.

As described above, the power storage device 8 being, for example, a lithium-ion rechargeable battery includes the protection circuit, which may suddenly stop the charging or the discharging. For the charger 10, this equates to the power storage device 8 being removed. The charger 10 thus has its output end being open. In this case, in the charger 10 under constant current control, the battery current Ib cannot flow through, which can cause the voltage (battery voltage Vb) to suddenly increase at the output end of the charger 10.

In the constant current control being selected, for example, the current feedback value I1 is typically greater than the voltage feedback value V1, and the power feedback signal Vf substantially indicates the current feedback value I1, as described above. However, when the battery voltage Vb suddenly increases during the constant current control, the voltage feedback value V1 exceeds the current feedback value I1, and the power feedback signal Vf thus indicates the voltage feedback value V1. The feedback calculator 7 performing constant current control then performs feedback control to decrease the battery current Ib in response to a sudden increase in the battery current Ib. As the battery current Ib decreases, the voltage (battery voltage Vb) also decreases at the output end of the charger 10. In other words, as compared with when an abnormality is detected and responded by the controller 6, an abnormality is not to be detected but can be responded more quickly and appropriately by the feedback signal generator 5 and the feedback calculator 7, or by hardware.

The controller 6 also obtains the current feedback value I1 and the initial voltage feedback value V0 (voltage feedback value V1). The controller 6 can thus also detect such an abnormality and provide a command to stop the charging to the feedback calculator 7. However, as described above, this control is performed by the hardware and the software operating in cooperation. The responsiveness is thus lower than in the feedback control performed by the feedback calculator 7. In the present embodiment, the feedback calculator 7 quickly provides an initial response, and then the controller 6 provides the command to stop the charging to the feedback calculator 7 and then stops the charging. An abnormality can thus be responded more quickly in the present embodiment.

The same applies to when a short circuit occurs in the power storage device 8. In the constant voltage control being selected, for example, the voltage feedback value V1 is greater than the current feedback value I1, and the power feedback signal Vf substantially indicates the voltage feedback value V1. However, when a short circuit occurs during the constant voltage control, and the battery current Ib suddenly increases, the current feedback value I1 exceeds the voltage feedback value V1, and the power feedback signal Vf thus indicates the current feedback value I1. The feedback calculator 7 performing constant voltage control then performs feedback control to decrease the battery voltage Vb in response to a sudden increase in the battery voltage Vb. As the battery voltage Vb decreases, the battery current Ib also decreases. In other words, as compared with when an abnormality is detected and responded by the controller 6, an abnormality is not to be detected but can be responded more quickly and appropriately by the feedback signal generator 5 and the feedback calculator 7, or by hardware.

For a short circuit as well, the controller 6 can also detect such an abnormality and provide the command to stop the charging to the feedback calculator 7. In the present embodiment, the feedback calculator 7 quickly provides an initial response, and then the controller 6 provides the command to stop the charging to the feedback calculator 7 and then stops the charging. An abnormality can thus also be responded more quickly for a short circuit in the present embodiment.

As described above, the power feedback signal Vf suddenly increases when the charging or the discharging of the power storage device 8 is suddenly stopped or when a short circuit occurs in the power storage device 8. Although an abnormality may be responded under usual constant current or constant voltage control as described above, the feedback calculator 7 may clamp the switching control signal to stop an output from the power regulator 1 in response to a sudden increase in the power feedback signal Vf.

An overview of the charger for a power storage device described above will now be described briefly.

A charger according to an aspect is a charger for a power storage device. The charger includes a power regulator that regulates power supplied from a power supply and outputs the power to a power storage device, a current detector that detects a battery current supplied from the power regulator to the power storage device, a voltage detector that detects a battery voltage between positive and negative electrodes of the power storage device, a controller that performs feedback control over the power regulator based on the battery current and the battery voltage and is switchable between constant current control and constant voltage control, a feedback signal generator that generates, based on the battery current and the battery voltage, a power feedback signal usable for the constant current control and the constant voltage control, and a feedback calculator that generates, based on a difference between a command value being a target value of the battery current or the battery voltage and the power feedback signal, a control signal to control the power regulator through the constant current control or the constant voltage control.

In this structure, for example, the controller performs, in an early stage of charging in which the battery voltage is low, feedback control to allow the battery current to be constant through constant current control. When the battery voltage increases over the period of charging, the controller performs feedback control to allow a voltage applied between the positive and negative electrodes of the power storage device from the power regulator to be constant through constant voltage control. The power storage device can thus be charged with an appropriate control method. This structure generates, based on the battery current detected by the current detector and the battery voltage detected by the voltage detector, the power feedback signal that can be used for both the constant current control and the constant voltage control. This allows the control method to be shifted smoothly from the constant current control to the constant voltage control. A sudden change in the voltage or current due to, for example, disconnection of the electrical connection between the power storage device and the charger or a short circuit increases a value (corresponding to either a detection value of the battery current or a detection value of the battery voltage depending on the control method) indicated by the power feedback signal, which is common to the constant current control and the constant voltage control. Power output from the charger to the power storage device can thus be limited with the control method used. Any abnormality in at least one of the power storage device or the charger can thus be responded quickly. In this manner, the charger with this structure can charge a power storage device with an appropriate control method and can also respond quickly to an abnormal state during charging.

In the charger, at least one of the current detector or the voltage detector may include a detection value adjuster that adjusts a detection value to cause a signal level indicated by a detection value of the battery current and a signal level indicated by a detection value of the battery voltage to be equivalent to each other.

The power feedback signal can be used for both the constant current control and the constant voltage control. The power feedback signal may thus be equally used for both the constant current control and the constant voltage control. However, the battery current detected by the current detector and the battery voltage detected by the voltage detector may not be easily adjusted to equivalent signal levels upon detection. With at least one of the current detector or the voltage detector including the detection value adjuster, the signal levels indicated by the detection values of the battery current and the battery voltage are easily adjusted to be equivalent to each other irrespective of the structure of a detection circuit.

The feedback signal generator may include a first diode with a first anode terminal and a first cathode terminal and a second diode with a second anode terminal and a second cathode terminal. The first diode and the second diode may be included in a wired-OR circuit in which the first anode terminal is connected to the current detector, the second anode terminal is connected to the voltage detector, and the first cathode terminal and the second cathode terminal are connected to each other.

The wired-OR circuit including the diodes can transmit analog information appropriately. The feedback signal generator can thus appropriately transmit the battery current detected by the current detector and the battery voltage detected by the voltage detector to generate a power feedback signal.

The power regulator may be a chopper circuit including a switching element.

A power adjustment circuit being a switching power supply circuit such as a chopper circuit has a relatively simple structure with high controllability. The power regulator being a chopper circuit is thus appropriate for the charger for a power storage device.

The power supply may be a contactless receiver device including a receiver coil to receive power from a feeder coil contactlessly by electromagnetic induction and a rectifier circuit to rectify an alternating current received by the receiver coil into a direct current.

Power received by the contactless receiver device tends to vary depending on the positional relationship between the feeder coil and the receiver coil. The controller and the feedback calculator are to perform constant current control or constant voltage control with high responsiveness to variations in the power output from the charger to the power storage device and also to variations in the power input into the charger. As described above, the charger with this structure can charge a power storage device with an appropriate control method and can also respond quickly to an abnormal state during charging. The charger is thus useful for a contactless receiver device as a power supply.

What is claimed is:

1. A charger for a power storage device, the charger comprising:

a power regulator configured to regulate power supplied from a power supply and output the power to the power storage device;

a current detector configured to detect a battery current supplied from the power regulator to the power storage device;

a voltage detector configured to detect a battery voltage between positive and negative electrodes of the power storage device;

a controller configured to perform feedback control over the power regulator based on the battery current and the battery voltage, the controller switchable between constant current control and constant voltage control;

a feedback signal generator configured to generate, based on the battery current and the battery voltage, a power feedback signal usable for the constant current control and the constant voltage control; and a feedback calculator configured to generate, based on a difference between a command value that is a target value of the battery current or the battery voltage and the power feedback signal, a control signal to control the power regulator through the constant current control or the constant voltage control, wherein:

the charger includes only a single switching element between the power supply and a positive terminal of the power storage device for control of the constant current control and the constant voltage control.

2. A charger for a power storage device, the charger comprising:

a power regulator configured to regulate power supplied from a power supply and output the power to the power storage device;

a current detector configured to detect a battery current supplied from the power regulator to the power storage device;

a voltage detector configured to detect a battery voltage between positive and negative electrodes of the power storage device;

a controller configured to perform feedback control over the power regulator based on the battery current and the battery voltage, the controller switchable between constant current control and constant voltage control;

a feedback signal generator configured to generate, based on the battery current and the battery voltage, a power feedback signal usable for the constant current control and the constant voltage control; and a feedback calculator configured to generate, based on a difference between a command value that is a target value of the battery current or the battery voltage and the power feedback signal, a control signal to control the power regulator through the constant current control or the constant voltage control, wherein:

at least one of the current detector or the voltage detector comprises a detection value adjuster configured to adjust a detection value to cause a signal level indicated by a detection value of the battery current and a signal level indicated by a detection value of the battery voltage to be equivalent to each other.

3. A charger for a power storage device, the charger comprising:

a power regulator configured to regulate power supplied from a power supply and output the power to the power storage device;

a current detector configured to detect a battery current supplied from the power regulator to the power storage device;

a voltage detector configured to detect a battery voltage between positive and negative electrodes of the power storage device;

a controller configured to perform feedback control over the power regulator based on the battery current and the battery voltage, the controller switchable between constant current control and constant voltage control;

a feedback signal generator configured to generate, based on the battery current and the battery voltage, a power feedback signal usable for the constant current control and the constant voltage control; and a feedback calculator configured to generate, based on a difference between a command value that is a target value of the battery current or the battery voltage and the power feedback signal, a control signal to control the power regulator through the constant current control or the constant voltage control, wherein:

the feedback signal generator comprises a first diode with a first anode terminal and a first cathode terminal and a second diode with a second anode terminal and a second cathode terminal, and the first diode and the second diode are included in a wired-OR circuit in which the first anode terminal is connected to the current detector, the second anode terminal is connected to the voltage detector, and the first cathode terminal and the second cathode terminal are connected to each other.

4. The charger according to claim 1, wherein:

the power regulator is a chopper circuit comprising a switching element.

5. The charger according to claim 1, wherein:

the power supply is a contactless receiver device comprising a receiver coil to receive power from a feeder coil contactlessly by electromagnetic induction and a rectifier circuit to rectify an alternating current received by the receiver coil into a direct current.

* * * * *